(12) United States Patent
Ojima

(10) Patent No.: US 9,436,109 B2
(45) Date of Patent: Sep. 6, 2016

(54) METHOD OF MANUFACTURING RESIN PARTICLES, APPARATUS FOR MANUFACTURING RESIN PARTICLES, AND IMAGE FORMING APPARATUS

(71) Applicant: KYOCERA Document Solutions Inc., Osaka (JP)

(72) Inventor: Seishi Ojima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 20 days.

(21) Appl. No.: 13/900,922

(22) Filed: May 23, 2013

(65) Prior Publication Data

US 2013/0323635 A1 Dec. 5, 2013

(30) Foreign Application Priority Data

May 30, 2012 (JP) ................................ 2012-123229

(51) Int. Cl.
C08J 3/07 (2006.01)
G03G 9/08 (2006.01)
C08J 3/16 (2006.01)

(52) U.S. Cl.
CPC ........ *G03G 9/081* (2013.01); *C08J 3/16* (2013.01)

(58) Field of Classification Search
CPC .................................... C08J 3/07; C08J 3/16
USPC ........................................................ 523/322
See application file for complete search history.

(56) References Cited

U.S. PATENT DOCUMENTS

| | | | |
|---|---|---|---|
| 4,983,488 A | 1/1991 | Tan et al. | |
| 5,066,560 A | 11/1991 | Tan et al. | |
| 7,546,071 B2 | 6/2009 | Inoue et al. | |
| 8,356,798 B2 | 1/2013 | Takagi et al. | |
| 8,721,913 B2 | 5/2014 | Koizumi | |
| 2007/0206977 A1 | 9/2007 | Inoue et al. | |
| 2010/0326321 A1 | 12/2010 | Enomura | |

FOREIGN PATENT DOCUMENTS

| | | |
|---|---|---|
| CN | 101030061 A | 9/2007 |
| JP | 60-225170 A | 11/1985 |
| JP | 61-167956 A | 7/1986 |
| JP | 2001-305802 A | 11/2001 |
| JP | 2002-006553 A | 1/2002 |
| JP | 2006-341232 A | 12/2006 |
| JP | 2008-281787 A | 11/2008 |
| JP | 2008-310263 A | 12/2008 |
| JP | 2009-132871 A | 6/2009 |
| JP | 2009-235389 A | 10/2009 |
| JP | 2010-122677 A | 6/2010 |
| JP | 2010-122683 A | 6/2010 |
| JP | 2010-150560 A | 7/2010 |
| JP | 2012-096962 A | 5/2012 |
| WO | WO 2009/008388 A1 | 1/2009 |

OTHER PUBLICATIONS

Notice of Rejection mailed by Japan Patent Office on Jul. 29, 2014 in the corresponding Japanese patent application No. 2012-123229—6 pages.
Daisuke Honda, et al., "Fabrication of Copper Phthalocyanine Nanoparticles by Forced Thin Film Reactor," J. Jpn. Soc. Colour Mater., 82 [7], pp. 284-289, Jul. 20, 2009.
Notice of Rejection mailed by Japan Patent Office on Mar. 3, 2015 in the corresponding Japanese patent application No. 2012-123229—3 pages.
Notice of First Office Action from SIPO dated Apr. 3, 2015 in the corresponding Chinese patent application No. 201310196602.4.—6 pages.

*Primary Examiner* — Edward Cain
(74) *Attorney, Agent, or Firm* — Knobbe, Martens, Olson & Bear LLP

(57) ABSTRACT

A method of manufacturing resin particles uses a microreactor to mix first and second stock solutions, and to aggregate resin fine-particles to obtain resin particles. The microreactor includes stationary and rotating discs that are two discoid discs and that are disposed so that a gap is formed between circular surfaces of the two discs when the resin particles are manufactured, a first stock solution feed part that feeds the first stock solution from an end of the gap into the gap, and one or more second stock solution feed parts that are formed at the opposite side of the first stock solution feed part based on the center of the circular surface of the stationary disc by spatially connecting top and bottom surfaces of the stationary disc, and that feed the second stock solution containing an aggregating agent from the top surface side of the stationary disc to the gap.

3 Claims, 3 Drawing Sheets

METHOD OF MANUFACTURING RESIN PARTICLES, APPARATUS FOR MANUFACTURING RESIN PARTICLES, AND IMAGE FORMING APPARATUS

INCORPORATION BY REFERENCE

This application claims priority to Japanese Patent Application No. 2012-123229 filed on May 30, 2012, the entire contents of which are incorporated by reference herein.

BACKGROUND

The present disclosure relates to a method of manufacturing resin particles, an apparatus for manufacturing resin particles, and an image forming apparatus.

In general, in an electrophotographic process, a surface of an electrostatic latent image carrier is charged by corona discharge, and then is exposed to a laser, thereby forming an electrostatic latent image. This electrostatic latent image is developed to form a toner image by toner, and the toner image is transferred to a recording medium. Thereby, a high-quality image is obtained. Typically, for the toner applied in this electrophotographic process, the toner of toner particles that have an average particle size of 5 to 10 µm and are obtained by mixing a coloring agent, a charge control agent, a release agent, a magnetic material, etc. with a binder resin such as a thermoplastic resin, kneading, pulverizing, and classifying the mixture are used. Then, for the purpose of giving fluidity to the toner, performing charge control on the toner, or improving a cleaning characteristic, inorganic fine powder of silica or titanium oxide is externally added to the toner.

With regard to this toner, due to a recent request for high quality in a formed image, reducing a particle size of the toner to improve a resolution has been considered. To output a high-quality image, it is useful to reduce an average particle size of the toner to about 5 µm and to sharpen particle size distribution of the toner.

Thus, there is a proposal for a method of manufacturing the toner using an emulsion polymerization aggregating method of adding an aggregating agent to a mixed dispersion obtained by mixing a resin particle dispersion, a pigment dispersion, and a release agent dispersion, which are previously prepared, to reduce the particle size of the toner to sharpen the particle size distribution of the toner, and heating the mixed dispersion to obtain aggregated particles that serve as toner. Further, another method of manufacturing the toner from a fine-particle dispersion in which fine particles of polyester resin containing a pigment and a release agent are dispersed using a fine-particle aggregating method is proposed.

According to each of the above methods, the toner having a desired particle size can be reliably obtained by adjusting manufacturing conditions. However, to obtain the toner having the desired particle size, it is necessary to delay a heating speed of the fine-particle dispersion, and the aggregation of the fine particles is advanced until the toner reaches the desired particle size. As such, there is a problem in that it takes a long time to obtain the toner.

SUMMARY

The present disclosure has been made in consideration of these circumstances and is intended to obtain the resin particles having a desired particle size within a short time.

A method of manufacturing resin particles relating to an aspect of the present disclosure is configured to use a microreactor to mix a first stock solution and a second stock solution and to aggregate resin fine-particles to obtain resin particles. The microreactor includes stationary and rotating discs, a first stock solution feed part, and a second stock solution feed part.

Further, an apparatus for manufacturing resin particles relating to an aspect of the present disclosure includes stationary and rotating discs, a first stock solution feed part, and one or more second stock solution feed parts.

The stationary and rotating discs are two discoid discs, and are disposed so that a gap is formed between circular surfaces of the two discs when the resin particles are manufactured.

The first stock solution feed part feeds a first stock solution, which is a resin fine-particle dispersion, from an end of the gap into the gap.

The one or more second stock solution feed parts are formed at the opposite side of the first stock solution feed part based on the center of the circular surface of the stationary disc by spatially connecting top and bottom surfaces of the stationary disc, and feed a second stock solution containing an aggregating agent from the top surface side of the stationary disc to the gap.

DETAILED DESCRIPTION

A method of manufacturing resin particles, a method of manufacturing an electrostatic latent image developing toner, an apparatus for manufacturing resin particles, and an image forming apparatus relating to embodiments of the present disclosure will be described below in detail. However, the present disclosure is not at all limited to embodiments below, and may be implemented with appropriate modification within the object of the present disclosure. In addition, although description may be occasionally omitted with respect to repeated matters, this does not limit the gist of the present disclosure.

Hereinafter, a microreactor serving as an apparatus for manufacturing resin particles, and a method of manufacturing resin particles using the microreactor, relating to an embodiment of the present disclosure will be described using FIG. 1.

<Microreactor>

Figure 1:
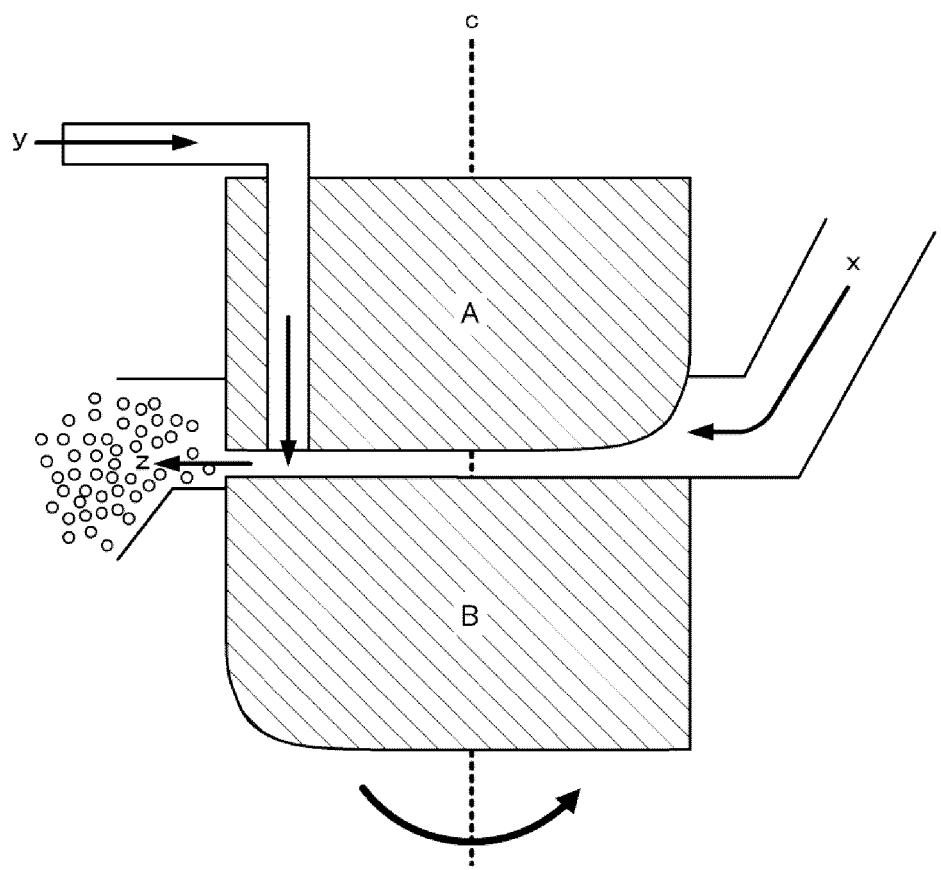
FIG. 1 is a schematic cross-sectional view of a microreactor used to prepare a dispersion of resin particles.

FIG. 1 is a schematic cross-sectional view of a microreactor used in a method of manufacturing resin particles. As shown in FIG. 1, the microreactor includes a stationary disc A and a rotating disc B, which are two discoid discs. The stationary disc A and the rotating disc B are disposed with a gap so that a thin layer can be formed therebetween.

In the microreactor shown in FIG. 1, a first stock solution that is a resin fine-particle dispersion is fed from a first stock solution feed part x, and a second stock solution containing an aggregating agent is fed from a second stock solution feed part y. Resin particles are manufactured in the gap formed between the stationary disc A and the rotating disc B by feeding the first stock solution and the second stock solution, and are discharged from a solution discharge part z as a dispersion of the resin particles.

The second stock solution feed part y is formed at the opposite side of the first stock solution feed part x based on the center of a circular surface of the stationary disc A by spatially connecting top and bottom surfaces of the stationary disc A, and feeds the second stock solution containing the aggregating agent from the top surface side of the stationary disc A to the gap.

The microreactor shown in FIG. 1 uses the stationary disc A having a floating structure that is movable in a direction parallel with a rotation axis c. Thus, a height of the gap formed by the stationary disc A and the rotating disc B is adjusted by a pressure which is exerted in a direction in which the stationary disc A is pushed up (in an upward direction in FIG. 1) and which is caused by inflow of the first stock solution that is the resin fine-particle dispersion fed from the first stock solution feed part x, dead weight of the stationary disc A, and a pressure applied in a direction in which the stationary disc A is pushed down (in a downward direction in FIG. 1). That is, the height of the gap formed between the stationary disc A and the rotating disc B when the resin particles are manufactured can be adjusted by adjusting a flow rate of the first stock solution, mass of the stationary disc A, and/or a back pressure applied from an upper side of the stationary disc A. A pressure from the upper side toward the stationary disc A may include a back pressure caused by a gas. The back pressure when the resin particles are manufactured is preferably equal to or less than 0.5 MPa.

A material for the stationary disc A and the rotating disc B is not particularly limited as long as it is not easily corroded by the first stock solution and the second stock solution and has sufficient strength. As the material for the stationary disc A and the rotating disc B, a material that is hard and can be mirror-polished is preferably used. For example, such a material may include silicon carbide, tungsten carbide, boron ceramic, and so on, and a material whose surface is coated with diamond-like carbon may be used.

Further, the height of the gap formed by the stationary disc A and the rotating disc B is preferably adjusted depending on kinds of resin particles obtained by aggregating the first stock solution, the second stock solution, and the resin fine-particles. The height of the gap when the resin particles are manufactured preferably ranges from 1 to 50 μm.

Further, a diameter of the stationary disc A and a diameter of the rotating disc B of the same size are preferably used. The diameters of the stationary disc A and the rotating disc B are not particularly limited, but preferably range from 100 mm to 300 mm.

The rotating disc B rotates about the rotation axis c that passes through the centers of the stationary disc A and the rotating disc B. A rotational speed of the rotating disc B is not particularly limited, but preferably ranges from 200 to 3,500 rpm, more preferably from 500 to 2,000 rpm when the resin particles are manufactured. When the rotational speed of the rotating disc B departs from the preferred range, it is difficult to obtain the resin particles having a desired particle size and sharp particle size distribution.

The number of second stock solution feed parts y provided for the stationary disc A may be one, or two or more. When the number of second stock solution feed parts y is two or more, the second stock solution containing the aggregating agent fed from the second stock solution feed parts may be one kind, or two kinds or more. A shape of the second stock solution feed part y is appropriately designed in consideration of a feed rate of the second stock solution.

As the microreactor described above is used, the resin particles of the desired particle size which have the sharp particle size distribution can be manufactured within a short time. The microreactor having the aforementioned configuration may, for instance, include a forced thin film reactor (ULREA SS-11, available from M Technique Co. Ltd.). Further, the illustrated forced thin film reactor can use a household power supply as a driving power supply. As such, when a small amount is manufactured, energy efficiency is excellent compared to a conventional method of manufacturing resin particles based on a batch type. Hereinafter, the method of manufacturing resin particles using the microreactor will be described.

[Method of Manufacturing Resin Particles Using Microreactor]

First, as shown in FIG. 1, in the method of manufacturing resin particles using the microreactor, the first stock solution that is the resin fine-particle dispersion is fed from the first stock solution feed part x, and the gap formed by the stationary disc A and the rotating disc B is filled with the first stock solution, thereby forming a thin film fluid. Next, the second stock solution containing the aggregating agent fed from the second stock solution feed part y shown in FIG. 1 is fed to the thin film fluid of the first stock solution, and the first stock solution and the second stock solution are mixed to aggregate the resin fine-particles in the gap formed by the stationary disc A and the rotating disc B. Thereby, the resin particles are obtained. The resin particles are collected by the solution discharge part z in a state in which they are dispersed in liquid. Hereinafter, the first stock solution that is the resin fine-particle dispersion and the second stock solution containing the aggregating agent, both of which are used in the method of manufacturing resin particles, will be described.

(First Stock Solution that is Resin Fine-Particle Dispersion)

The first stock solution used in the method of manufacturing resin particles is the resin fine-particle dispersion in which the resin fine-particles are dispersed in a solvent. A resin used in the resin fine-particle dispersion is not particularly limited as long as the aggregation of the resin fine-particles caused by the microreactor is well advanced. Specific examples of the resin may include thermoplastic resins such as styrenic resin, (meth)acrylic resin, styrene-(meth)acrylic resin, polyethylene resin, polypropylene resin, vinyl chloride resin, polyester resin, polyamide resin, polyurethane resin, polyvinyl alcohol resin, vinyl ether resin, N-vinyl resin, and styrene-butadiene resin.

Further, as the resin containing the resin fine-particle dispersion, since the aggregation of the resin fine-particles is well advanced, a resin having an acidic group such as a carboxyl group or a sulfonate group at a part (a terminus or a side chain) of a molecular chain is preferred. The resin having this acidic group may include (meth)acrylic resin, styrene-(meth)acrylic resin, and polyester resin.

When the resin is the resin having the acidic group, an acid value of the resin is preferably 5 to 40 mg KOH/g. When the acid value is too low, it may be difficult for the aggregation of the fine particles to be well advanced depending on a formula used during the aggregation. When the acid value is too high, there is a possibility of various performances of the toner being damaged by an influence of humidity under a high humidity condition.

Hereinafter, the resin having the acidic group will be described in an order of (meth)acrylic resin, styrene-(meth)acrylic resin, and polyester resin.

<(Meth)Acrylic Resin>

The (meth)acrylic resin is a resin obtained by at least copolymerizing a monomer containing a (meth)acrylic monomer. A content of a unit that is contained in the (meth)acrylic resin and is derived from the (meth)acrylic monomer is not particularly limited within a range that does not inhibit the purpose of the present disclosure, but it is preferably 70 wt % or more, more preferably 80 wt % or more, particularly preferably 90 wt % or more, and most preferably 100 wt %.

The (meth)acrylic monomer used to prepare the (meth)acrylic resin may include: (meth)acrylic acid; alkyl(meth)acrylates such as methyl(meth)acrylate, ethyl(meth)acrylate, and propyl(meth)acrylate; and (meth)acrylamide compounds such as (meth)acrylamide, N-alkyl(meth)acrylamides, N-aryl(meth)acrylamides, N,N-dialkyl(meth)acrylamides, and N,N-diaryl(meth)acrylamides. Further, the (meth)acrylic resin preferably contains a carboxyl group, which is contained in a unit derived from the (meth)acrylic acid, as an acidic group. In this case, a quantity of use of the (meth)acrylic acid is increased when the (meth)acrylic resin is prepared, and thereby the acid value of the (meth)acrylic resin can be adjusted.

When the (meth)acrylic resin is a resin in which the (meth)acrylic monomer and a monomer other than the (meth)acrylic monomer are copolymerized, the other monomer may include: olefins such as ethylene, propylene, butene-1, pentene-1, hexene-1, heptene-1, and octene-1; allyl esters such as allyl acetate, allyl benzoate, allyl acetoacetate, and allyl lactate; vinyl ethers such as hexyl vinyl ether, octyl vinyl ether, ethylhexyl vinyl ether, methoxyethyl vinyl ether, ethoxyethyl vinyl ether, chloroethylvinyl ether, 2-ethylbutyl vinyl ether, dimethylaminoethyl vinyl ether, diethylaminoethyl vinyl ether, benzyl vinyl ether, vinyl phenyl ether, vinyl tolyl ether, vinyl chlorophenyl ether, vinyl-2,4-dichloro phenyl ether, and vinyl naphthyl ether; and vinyl esters such as vinyl acetate, vinyl propionate, vinyl butyrate, vinyl isobutyrate, vinyl diethylacetate, vinyl chloroacetate, vinyl methoxyacetate, vinyl butoxyacetate, vinyl phenyl acetate, vinyl acetoacetate, vinyl lactate, vinyl benzoate, vinyle salicylate, vinyl chlorobenzoate, and vinyle naphthoate.

<Styrene-(Meth)Acrylic Resin>

The styrene-(meth)acrylic resin is a resin obtained by at least copolymerizing a monomer containing a styrenic monomer and a (meth)acrylic monomer. The sum of contents of a unit that is contained in the styrene-(meth)acrylic resin and is derived from the styrenic monomer and a unit that is contained in the styrene-(meth)acrylic resin and is derived from the (meth)acrylic monomer is not particularly limited within a range that does not inhibit the purpose of the present disclosure, but it is preferably 70 wt % or more, more preferably 80 wt % or more, particularly preferably 90 wt % or more, and most preferably 100 wt %.

The styrenic monomer used to prepare the styrene-(meth)acrylic resin may include styrene, α-methylstyrene, o-methylstyrene, m-methylstyrene, p-methylstyrene, p-ethylstyrene, 2,4-dimethylstyrene, p-n-butylstyrene, p-dodecylstyrene, p-methoxystyrene, p-phenylstyrene, and p-chlorostyrene.

The (meth)acrylic monomer used to prepare the styrene-(meth)acrylic resin is similar to the (meth)acrylic monomer used to prepare the (meth)acrylic resin.

Further, the styrene-(meth)acrylic resin preferably contains a carboxyl group, which is contained in the unit derived from the (meth)acrylic acid, as an acidic group. In this case, a quantity of use of the (meth)acrylic acid is increased when the styrene-(meth)acrylic resin is prepared, and thereby the acid value of the styrene-(meth)acrylic resin can be adjusted.

When the styrene-(meth)acrylic resin is a resin in which the styrenic monomer, the (meth)acrylic monomer, the styrenic monomer, and a monomer other than the (meth)acrylic monomer are copolymerized, an example of the other monomer is similar to the monomer other than the (meth)acrylic monomer in the (meth)acrylic resin.

<Polyester Resin>

As the polyester resin, a resin obtained by polycondensation or copolycondensation of a divalent, or trivalent or higher alcohol component and a divalent, or trivalent or higher carboxylic acid component may be used. A component used in synthesizing the polyester resin may include an alcohol component and a carboxylic component as follows.

Specific example of the divalent, or trivalent or higher alcohol component may include diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, and polytetramethylene glycol; bisphenols such as bisphenol A, hydrogenated bisphenol A, polyoxyethylated bisphenol A, and polyoxypropylated bisphenol A; and trivalent or higher alcohols such as sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Specific example of the divalent, or trivalent or higher carboxylic acid component may include divalent carboxylic acids such as alkyl or alkenyl succinic acids including maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, 1,10-decanedicarboxylic acid, malonic acid, or n-butyl succinic acid, n-butenyl succinic acid, isobutyl succinic acid, isobutenyl succinic acid, n-octyl succinic acid, n-octenyl succinic acid, n-dodecyl succinic acid, n-dodecenyl succinic acid, isododecyl succinic acid, and isododecenyl succinic acid; and trivalent or higher carboxylic acids such as 1,2,4-benzene tricarboxylic acid (trimellitic acid), 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-2-methylene carboxypropane, 1,2,4-cyclohexane tricarboxylic acid, tetra(methylene carboxyl)methane, 1,2,7,8-octanetetracarboxylic acid, pyromellitic acid, and Empol trimer acid. These divalent, or trivalent or higher carboxylic acid components may be used as ester-forming derivatives such as acid halides, anhydrides, and lower alkylesters. Here, the term "lower alkyl" refers to an alkyl group having a number of carbon atoms ranging from 1 to 6.

The acid value of the polyester resin may be adjusted by adjusting a functional group balance between a hydroxyl group which the alcohol component used for the synthesis of the polyester resin has and a carboxyl group which the carboxylic acid component has.

A glass transition temperature (Tg) of the resin is not particularly limited within a range that does not inhibit the purpose of the present disclosure. Typically, Tg of the resin preferably ranges from 30 to 60° C. When Tg of the resin is too low, the fusion of the particles easily takes place when the resin particles and the toner are cleaned and dried. When Tg of the resin is too high, it is necessary to increase a temperature condition when the resin fine-particles are aggregated, and the energy required for the aggregation is easily increased.

<Method of Measuring Glass Transition Temperature (Tg)>

The glass transition temperature of the resin can be found by a measuring method based on JIS K7121. More specifically, the glass transition temperature of the resin can be found by using a differential scanning calorimeter (DSC-6200, available from Seiko Instruments Inc.) as a measuring device, and measuring an endothermic curve. The glass transition temperature can be found from an endothermic curve obtained by putting a measurement sample of 10 mg into an aluminum pan, using an empty aluminum pan as a reference, and measuring the measurement sample within a measurement temperature range of 25 to 200° C. at a heating speed of 10° C./min under room temperature, normal humidity.

A number-average molecular weight (Mn) of the resin is not particularly limited within a range that does not inhibit the purpose of the present disclosure. Typically, the number-average molecular weight (Mn) of the resin preferably ranges from 2,000 to 20,000. Further, a molecular weight distribution (Mw/Mn) expressed as a ratio of a mass-average molecular weight (Mw) to a number-average molecular weight (Mn) preferably ranges from 2 to 60, and more preferably from 2 to 10. By setting the molecular weight distribution of the resin to such a range, the particle size distribution of the aggregated particles is easily sharpened. The number-average molecular weight (Mn) and the mass-average molecular weight (Mw) can be measured by gel permeation chromatography.

A softening point of the resin is not particularly limited within a range that does not inhibit the purpose of the present disclosure. Typically, the softening point of the resin preferably ranges from 80 to 150° C., and more preferably from 90 to 140° C. If the softening point of the resin is too high, it may be difficult for the toner obtained when the resin particles formed by aggregating the resin fine-particles are collected as the toner to be fixed well to a recording medium at a low temperature. If the softening point of the resin is too low, the toner obtained when the resin particles formed by aggregating the resin fine-particles are collected as the toner may be aggregated during storage at a high temperature, and heat-resistant storage stability of the toner may be damaged. The softening point of the resin can be measured according to the following method.

<Method of Measuring Softening Point>

The softening point of the resin (toner) is measured by a Koka-type flow tester (CFT-500D, available from Shimadzu Corporation). The softening point is measured with use of the toner of 1.5 g as a sample and a die having a diameter of 1.0 mm at a height of 1.0 mm under conditions of a heating speed of 4° C./min, a preheating time of 300 seconds, a load of 5 kg, and a measurement temperature range of 60 to 200° C. The softening point is read by an S-curve relevant to a temperature (° C.) and a stroke (mm) obtained by the measurement of the flow tester.

Figure 2:
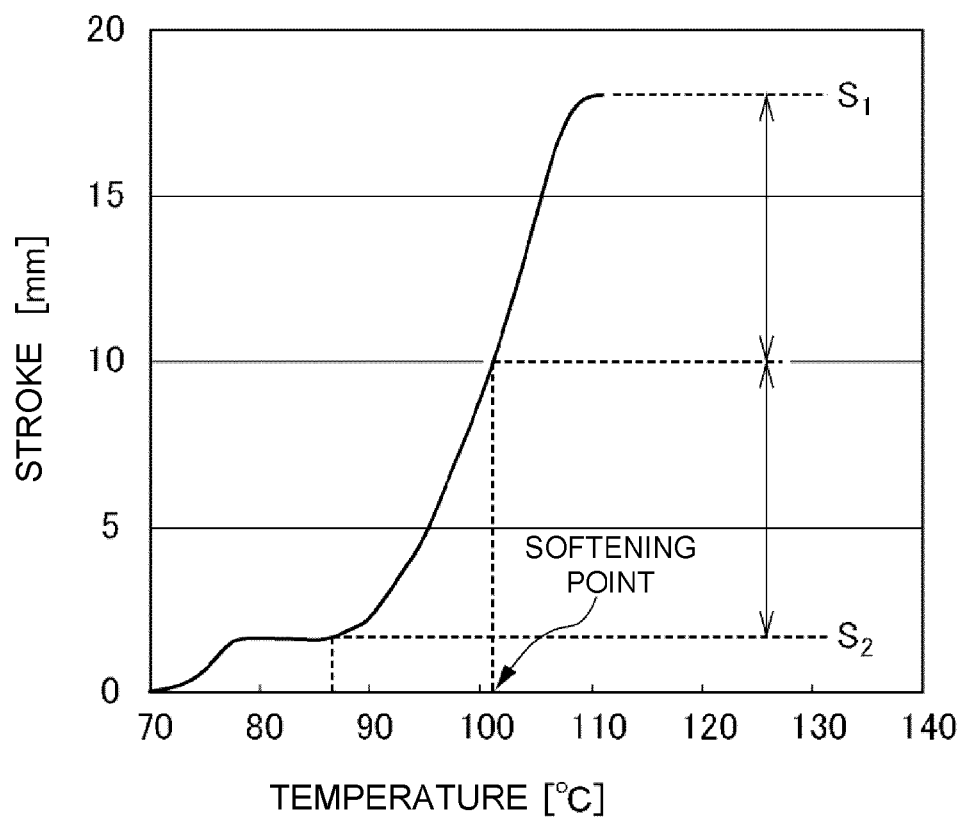
FIG. 2 is a view for describing a method of measuring a softening point using a Koka-type flow tester.

A method of reading the softening point is described based on FIG. 2. A maximum value of the stroke is set to S1, and a stroke value of a base line of a low temperature side is set to S2. In the S-curve, a temperature at which the stroke value becomes (S1+S2)/2 is set to the softening point of the measurement sample.

<Method of Preparing Resin Fine-Particle Dispersion>

In a method of preparing the resin fine-particle dispersion, when a resin is an addition-polymerizable resin such as (meth)acrylic resin or styrene(meth)acrylic resin, this resin is prepared by an emulsion polymerization method. Thereby, the resin can be prepared as a dispersion of the resin fine-particles.

On the other hand, when the resin is a polyester resin, the resin is kneaded in a molten state by a kneader such as a twin-screw extruder, a triple roll kneader, or a double roll kneader. The obtained kneaded melt is cooled, and then is coarsely pulverized by a pulverizing apparatus such as a cutter mill, a feather mill, or a jet mill. The coarsely pulverized material is dispersed, for instance, in an aqueous medium, and in this state, is heated to a temperature 10° C. or more higher than the softening point of the resin which is measured by the flow tester. A strong shear force is applied to the heated dispersion by a homogenizer or a pressure discharge type disperser. Thereby, the dispersion in which the resin fine-particles are dispersed in the aqueous medium is obtained.

The apparatus applying the strong shear force to the dispersion may include NANO3000 (available from Beryu Co., Ltd.), Nanomizer (available from Yoshida Kikai Kogyo Co., Ltd.), Microfluidizer (available from MFI Company), Gaulin Homogenizer (available from Manton-Gaulin Company), and Clearmix W-Motion (available from M Technique Co., Ltd.).

(Resin Fine-Particle Dispersion in which Coloring Agent and/or Release Agent are Contained in Resin Fine-Particles)

Further, the resin fine-particles contained in the resin fine-particle dispersion that is the first stock solution may contain a coloring agent and/or a release agent as long as the aggregation of the resin fine-particles caused by the microreactor is well advanced. The coloring agent and/or the release agent that may be contained in the resin fine-particles may be appropriately selected from conventional compounds used as coloring agents and release agents for manufacturing toners.

<Coloring Agent>

As the coloring agent contained in the electrostatic latent image developing toner, a known coloring agent may be used to match a color of toner particles. Specific examples of the preferred coloring agent that may be added to the toner may include the following coloring agents.

A yellow coloring agent may include a condensed azo compound, an isoindolinone compound, an anthraquinone compound, an azo metal complex, a methine compound, and an allylamide compound. In detail, the yellow coloring agent may include C.I. Pigment Yellows 3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194; Naphtol Yellow S, Hansa Yellow G, and C.I. Vat Yellow.

A magenta coloring agent may include a condensed azo compound, a diketopyrrolopyrrole compound, an anthraquinone compound, a quinacridone compound, a base dye lake compound, a naphthol compound, a benzimidazolone compound, a thioindigo compound, and a perylene compound. In detail, the magenta coloring agent may include C.I. Pigment Reds 2, 3, 5, 6, 7, 19, 23, and 48; 2 and 48; 3 and 48; 4 and 57; 1 and 81; and 1, 122, 144, 146, 150, 166, 169, 177, 184, 185, 202, 206, 220, 221, and 254.

A cyan coloring agent may include a copper phthalocyanine compound, a copper phthalocyanine derivative, an anthraquinone compound, and a base dye lake compound. In detail, the cyan coloring agent may include C.I. Pigment Blues 1, 7, 15, and 15; 1 and 15; 2 and 15; 3 and 15; and 4, 60, 62, and 66, Phthalocyanine Blue, C.I. Vat Blue, and C.I. Acid Blue.

A quantity of use of the coloring agent is not particularly limited within a range that does not inhibit the purpose of the present disclosure. Specifically, the quantity of use preferably ranges from 1 to 30 parts by mass with respect to 100 parts by mass of resin.

<Release Agent>

The toner for developing the electrostatic latent image includes a release agent for the purpose of improving fixability and offset resistance. The type of the release agent is not particularly limited if one conventionally used as a release agent for toner is used.

Examples of the preferred release agent include: for instance, aliphatic hydrocarbon waxes such as low-molecular-weight polyethylene, low-molecular-weight polypropylene, a polyolefin copolymer, polyolefin wax, microcrystalline wax, paraffin wax, and Fisher-Tropsch wax; oxides of the aliphatic hydrocarbon wax such as oxidized polyethylene wax and a block copolymer of the polyethylene oxide wax; vegetable waxes such as candelilla wax, carnauba wax, Japan wax, jojoba wax, and rice wax; animal waxes such as bees' wax, lanolin, and whale wax; mineral waxes such as ozokerite, ceresin, and petrolatum; waxes containing fatty acid ester as a main component such as montanate ester wax and castor wax; and waxes obtained by deoxidization of a part or the whole of fatty acid ester such as deoxidized carnauba wax.

Further, the release agents that can be preferably used may include: saturated linear chain fatty acids such as palmitic acid, stearic acid, montanic acid, and long chain alkyl carboxylic acids having a long chain alkyl group; unsaturated fatty acids such as brassidic acid, eleostearic acid, and parinaric acid; saturated alcohols such as stearyl alcohol, eicosyl alcohol, behenyl alcohol, carnaubyl alcohol, ceryl alcohol, melissyl alcohol, and long chain alkyl alcohols having a long chain alkyl group; polyhydric alcohols such as sorbitol; fatty acid amides such as linoleic acid amide, oleic acid amide, and lauric acid amide; saturated fatty acid bisamides such as methylenebis stearic acid amide, ethylenebis caprylic acid amide, ethylenebis lauric acid amide, and hexamethylenebis stearic acid amide; unsaturated fatty acid amides such as ethylenebis oleic acid amide, hexamethylenebis oleic acid amide, N,N'-dioleyladipic acid amide, and N,N'-dioleylsebacic acid amide; aromatic bisamides such as m-xylenebisstearic acid amide and N,N'-distearylisophthalic acid amide; fatty acid metal salts such as calcium stearate, calcium laurate, zinc stearate, and magnesium stearate; waxes obtained by grafting a vinyl monomer such as styrene or acrylic acid on aliphatic hydrocarbon wax; partially esterified products of a fatty acid and polyhydric alcohol such as behenic acid monoglyceride; and methyl ester compounds having a hydroxyl group obtained by hydrogenation of vegetable fat and oil.

A quantity of use of the release agent is not particularly limited within a range that does not inhibit the purpose of the present disclosure. A specific quantity of use of the release agent preferably ranges from 1 to 20 parts by mass with respect to 100 parts by mass of resin, and more preferably from 5 to 15 parts by mass.

A solvent used in the resin fine-particle dispersion is not particularly limited as long as the aggregation of the resin fine-particles caused by the microreactor is well advanced, and is appropriately selected from conventional solvents used to disperse the resin fine-particles. As the solvent used in the resin fine-particle dispersion, a solvent in which an aggregating agent is easily dissolved and in which the resin composed of the resin fine-particles is hardly dissolved is preferred, and may include, for instance, water, and alcohols such as methanol and ethanol.

<Method of Preparing Resin Fine-Particle Dispersion in which Coloring Agent and/or Release Agent are Contained in Resin Fine-Particles>

The resin fine-particle dispersion in which a coloring agent and/or a release agent are contained in resin fine-particles may include, for instance, (a) to (c) as follows.

(a) A resin fine-particle dispersion in which a coloring agent is contained in resin fine-particles.

(b) A resin fine-particle dispersion in which a release agent is contained in resin fine-particles.

(c) A resin fine-particle dispersion in which a coloring agent and a release agent are contained in resin fine-particles.

Hereinafter, a method of preparing the resin fine-particle dispersion in which the coloring agent is contained in the resin fine-particles will be described. However, any one of the resin fine-particle dispersion in which the release agent is contained in the resin fine-particles and the resin fine-particle dispersion in which the coloring agent and the release agent are contained in the resin fine-particles may be prepared similarly to those of the aforementioned method, except that the component mixed with the resin fine-particles is changed.

(Preparation of Resin Fine-Particle Dispersion in which a Coloring Agent is Contained in Resin Fine-Particles)

Hereinafter, a method of preparing the resin fine-particle dispersion in which the coloring agent is contained in the resin fine-particles using an aqeuous medium will be described.

First, the resin and the coloring agent are mixed by a Henschel mixer (available from Mitsui Mining Co., Ltd.). Further, in a method of manufacturing an electrostatic latent image developing toner which will be described below and collects the resin particles as the electrostatic latent image developing toner, when the resin fine-particle dispersion is prepared, components such as a charge control agent and magnetic powder may be mixed together as needed when the resin and the coloring agent are mixed.

Next, the obtained mixture is kneaded in a molten state by a kneader such as a twin-screw extruder, a triple roll kneader, or a double roll kneader, thereby obtaining a coloring agent-containing resin composition. The obtained coloring agent-containing resin composition is cooled, and then is coarsely pulverized by a pulverizing apparatus such as a cutter mill, a feather mill, or a jet mill. The coarsely pulverized product of the coloring agent-containing resin composition is dispersed in an aqueous medium, and in this state, is heated to a temperature 10° C. or more higher than the softening point of the resin which is measured by the flow tester. A strong shear force is applied to the heated dispersion of the coloring agent-containing resin composition by a homogenizer or a pressure discharge type disperser. Thereby, the dispersion in which the resin fine-particles containing the coloring agent are dispersed in the aqueous medium is obtained.

The apparatus applying the strong shear force to the dispersion may include NANO3000 (available from Beryu Co., Ltd), Nanomizer (available from Yoshida Kikai Kogyo Co., Ltd.), Microfluidizer (available from MFI Company), Gaulin Homogenizer (available from Manton-Gaulin Company), and Clearmix W-Motion (available from M Technique Co., Ltd.).

A volume average particle size (D50) of the resin fine-particles prepared by the aforementioned method is preferably equal to or less than 1 μm, and more preferably ranges from 0.1 to 0.5 μm. As the volume average particle size (D50) is set to such a range, the resin particles that are uniform in shape and are sharp in particle size distribution are easily prepared. Further, when the resin particles are collected as the electrostatic latent image developing toner, the volume average particle size (D50) of the resin fine-particles is set to such a range, and thereby performance and productivity of the toner can be stabilized. The volume average particle size (D50) of the resin fine-particles may be measured by a laser diffraction type particle size distribution measuring apparatus.

(Second Stock Solution Containing Aggregating Agent)

The second stock solution used in the method of manufacturing resin particles contains an aggregating agent. The aggregating agent contained in the second stock solution is not particularly limited as long as it can aggregate the resin fine-particle dispersion that is the first stock solution well. Examples of the aggregating agent contained in the second stock solution may include an inorganic metallic salt, an inorganic ammonium salt, and a divalent or higher metallic complex. The inorganic metallic salt may include, for instance, metallic salts such as sodium sulfate, sodium chloride, calcium chloride, calcium nitrate, barium chloride, magnesium chloride, zinc chloride, aluminum chloride, and aluminum sulfate, and inorganic metallic salt polymers such as polyaluminum chloride and polyaluminum hydroxide. The inorganic ammonium salt may include, for instance, ammonium sulfate, ammonium chloride, and ammonium nitrate. Further, a quaternary ammonium salt type cationic surfactant and polyethylene imine may also be used as the aggregating agent. In addition, a solvent dissolving the aggregating agent is not particularly limited as long as it can dissolve the aggregating agent well.

Among these aggregating agents, the divalent metallic salt and the monovalent metallic salt may be particularly used.

As the solvent dissolving the aggregating agent, a solvent that is high in solubility of the aggregating agent and hardly dissolves the resin composed of the resin fine-particles is desirable, and preferred examples thereof may include water, and alcohols such as methanol and ethanol.

The first stock solution and the second stock solution may be mixed with a known organic solvent, a high molecular compound, and a surfactant for the purpose of controlling the particle shape.

A feed rate of the first stock solution is also changed depending on a shape of the microreactor, but it typically has a preferred range of 100 to 1000 ml/min. A feed rate of the second stock solution is changed depending on that of the first stock solution, but it typically has a preferred range of 1 to 500 ml/min. Further, when the first stock solution and the second stock solution are fed, temperatures thereof are preferably adjusted so that a temperature of the mixed solution of the first stock solution and the second stock solution is equal to or higher than the glass transition temperature of the resin fine-particles contained in the resin fine-particle dispersion in the gap formed by the microreactor.

Further, the particle size distribution of the resin particles can be sharpened by increasing a rotational speed of the rotating disc B which increases the back pressure applied from the upper side of the stationary disc A, or by raising the feed rate of the second stock solution.

A volume average particle size (MV) and a number average particle size (MN) of the resin particles may be measured using a particle size distribution measuring apparatus (MT3300, available from Microtrac Inc.). Further, a particle size distribution (MV/MN) can be calculated from values of the measured MV and MN.

The method of manufacturing resin particles of the present disclosure which is described above can obtain the resin particles of the desired particle size which have the sharp particle size distribution within a short time. For this reason, the resin particles, which are obtained according to the method of manufacturing resin particles of the present disclosure and which at least contain the binder resin, the coloring agent, and the release agent, are useful as the toner itself for developing the electrostatic latent image or toner parent particles, to surfaces of which an external additive is attached to become the toner. Hereinafter, the method of manufacturing the electrostatic latent image developing toner using the microreactor will be described.

[Method of Manufacturing Electrostatic Latent Image Developing Toner Using Microreactor]

In the method of manufacturing the electrostatic latent image developing toner using the microreactor, after the resin particles that at least contain the binder resin, the coloring agent, and the release agent are obtained according to the method of manufacturing resin particles, the obtained resin particles are collected as the electrostatic latent image developing toner or the toner parent particles, to the surfaces of which the external additive is attached to become the toner. When the resin particles are collected as the toner parent particles, the collected toner parent particles become the electrostatic latent image developing toner obtained by attaching the external additive to the surfaces thereof.

Hereinafter, the first stock solution that is the resin fine-particle dispersion used in the method of manufacturing the electrostatic latent image developing toner will be described. Further, since the same second stock solution which contains the aggregating agent and which is described in the method of manufacturing the resin fine-particles can be used as the second stock solution which contains the aggregating agent and which is used in the method of manufacturing the electrostatic latent image developing toner, description thereof will be omitted.

(First Stock Solution that is Resin Fine-Particle Dispersion)

The first stock solution that is the resin fine-particle dispersion used in the method of manufacturing the electrostatic latent image developing toner (hereinafter simply referred to as "toner") is the resin fine-particle dispersion in which the resin fine-particles are dispersed in the solvent. The resin fine-particles contain the coloring agent and the release agent. The toner essentially contains the coloring agent and the release agent, and may contain the charge control agent and the magnetic powder as needed. For the resin, the coloring agent, and the release agent, ones similar to those described regarding the manufacturing of the resin particles may be used. Hereinafter, description will be made of the charge control agent and the magnetic powder, which are arbitrary materials that are used to manufacture the toner and are mixed with the first stock solution that is the resin fine-particle dispersion.

<Charge Control Agent>

The electrostatic latent image developing toner may include the charge control agent as needed. For this reason, the charge control agent may be contained in the resin fine-particles. The charge control agent is used for obtaining the toner having good durability and stability by improving stability of a charging level of the toner or a charge rise characteristic that gives an indication of whether or not the toner can be charged to a predetermined charging level within a short time. When the development is performed by positively changing the toner, a positively chargeable charge control agent is used. When the development is performed by negatively changing the toner, a negatively chargeable charge control agent is used.

A type of the charge control agent is not particularly limited within a range that does not inhibit the purpose of the present disclosure, and may be properly selected from charge control agents that have been used for toners in the related art. Specific examples of a positively chargeable charge control agent include azine compounds such as pyridazine, pyrimidine, pyrazine, orthooxazine, metaoxazine, paraoxazine, orthothiazine, metathiazine, parathiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3, 5-tetrazine, 1,2,4,6-oxatriazine, 1,3,4,5-oxatriazine, phthalazine, quinazoline, and quinoxaline; direct dyes composed of an azine compound such as azine fast red FC, azine fast red 12BK, azine violet BO, azine brown 3G, azine light brown GR, azine dark green BH/C, azine deep black EW, and azine deep black 3RL; nigrosine compounds such as nigrosine, nigrosine salts, and nigrosine derivatives; acid dyes composed of a nigrosine compound such as nigrosine BK, nigrosine NB, and nigrosine Z; metal salts of naphthenic acid or a higher fatty acid; alkoxylated amines; alkylamides; quaternary ammonium salts such as benzylmethyl hexyldecyl ammonium and decyl trimethyl ammonium chloride. Among these positively chargeable charge control agents, the nigrosine compounds are particularly preferred in that a faster rising characteristic can be obtained. A combination of two or more kinds of these positively chargeable charge control agents can be used.

A resin that has a quaternary ammonium salt, carboxylate, or a carboxyl group as a functional group can also be used as the positively chargeable charge control agent. More specifically, examples of the resin include one kind, or two or more kinds of styrenic resin having a quaternary ammonium salt, acrylic resin having a quaternary ammonium salt, styrene-acrylic resin having a quaternary ammonium salt, polyester resin having a quaternary ammonium salt, styrenic resin having a carboxylate, acrylic resin having a carboxylate, styrene-acrylic resin having a carboxylate, polyester resin having a carboxylate, styrenic resin having a carboxyl group, acrylic resin having a carboxyl group, styrene-acrylic resin having a carboxyl group, and polyester resin having a carboxyl group. Molecular weights of these resins are not particularly limited as long as the purpose of the present disclosure is not hindered, and oligomers or polymers may be used.

Among the resins that may be used as the positively chargeable charge control agent, the styrene-acrylic resin having the quaternary ammonium salt as the functional group is more preferred in that a charged amount can be easily adjusted to a value within a desired range. In the styrene-acrylic resin having the quaternary ammonium salt as the functional group, specific examples of the preferred acrylic comonomer copolymerizing a styrene unit may include alkylester(meth)acrylates such as methyl acrylate, ethyl acrylate, n-propyl acrylate, iso-propyl acrylate, n-butyl acrylate, iso-butyl acrylate, 2-ethylhexyl acrylate, methyl methacrylate, ethyl methacrylate, n-butyl methacrylate, and iso-butyl methacrylate.

Further, as the quaternary ammonium salt, a unit derived from a dialkylaminoalkyl(meth)acrylate, a di alkylamino (meth)acrylamide, or a dialkylaminoalkyl(meth)acrylamide via a quaternizing process may be used. Specific examples of the dialkylaminoalkyl(meth)acrylate may include, for instance, dimethylaminoethyl(meth)acrylate, diethylaminoethyl(meth)acrylate, dipropylaminoethyl(meth)acrylate, and dibutyl aminoethyl(meth)acrylate. A specific example of the dialkyl(meth)acrylamide may include dimethyl methacrylamide. A specific example of the dialkylaminoalkyl(meth) acrylamide may include dimethylaminopropyl methacrylamide. In addition, a hydroxy group containing a polymerizable monomer such as hydroxyethyl(meth)acrylate, hydroxypropyl(meth)acrylate, 2-hydroxybutyl(meth) acrylate, or N-methylol(meth)acrylamide may also be used together in the event of polymerization.

Specific examples of the negatively chargeable charge control agent may include an organic metallic complex and a chelate compound. As the organic metallic complex and the chelate compound, acetylacetone metallic complexes such as aluminum acetylacetonate, and iron(II) acetylacetonate, and salicylic acid metallic complexes or salts such as chromium 3,5-di-tert-butyl salicylate are preferred, and salicylic acid metallic complexes or salts are more preferred. These negatively chargeable charge control agents may be used in combinations of two or more.

A quantity of use of the positively or negatively chargeable charge control agent is not particularly limited within a range that does not inhibit the purpose of the present disclosure. Typically, the quantity of use of the positively or negatively chargeable charge control agent preferably ranges from 1.5 to 15 parts by mass, more preferably from 2.0 to 8.0 parts by mass, and particularly preferably from 3.0 to 7.0 parts by mass when the whole quantity of the toner is given as 100 parts by mass. When the quantity of use of the charge control agent is too little, it is difficult to stably charge the toner with a predetermined polarity. As such, an image density of formed images falls below a desired value, or it is difficult to maintain the image density over a long period of time. Further, in this case, it is difficult for the charge control agent to be uniformly dispersed in the resin, and it is easy for fogging to take place at the formed image or for a latent image carrier to be contaminated. When the quantity of use of the charge control agent is too much, due to deterioration of environment resistance, an image defect in the formed image resulting from insufficient charging under high temperature, high humidity, or the contamination of the latent image carrier easily takes place.

<Magnetic Powder>

The magnetic powder is mixed with the electrostatic latent image developing toner as desired. A kind of the magnetic powder is not particularly limited within a range that does not inhibit the purpose of the present disclosure. Preferred examples of the magnetic powder may include: iron such as ferrite and magnetite; ferromagnetic metals such as cobalt and nickel; alloys containing iron and/or a ferromagnetic metal; compounds containing iron and/or a ferromagnetic metal; ferromagnetic alloys undergoing ferromagnetization such as heat treatment; and chromium dioxide.

A particle size of the magnetic powder is not limited within a range that does not inhibit the purpose of the present disclosure. The specific particle size of the magnetic powder preferably ranges from 0.1 to 1.0 and more preferably from 0.1 to 0.5 μm. When the magnetic powder having a particle size within such a range is used, it is easy to uniformly disperse the magnetic powder in the resin.

For the purpose of improving dispersibility in the toner, a powder that is subjected to surface treatment by a surface treatment agent such as a titanium coupling agent or a silane coupling agent may be used as the magnetic powder.

A quantity of use of the magnetic powder is not particularly limited within a range that does not inhibit the purpose of the present disclosure. When the toner is used as a one-component developer, the specific quantity of use of the magnetic powder preferably ranges from 35 to 60 parts by mass, and more preferably from 40 to 60 parts by mass when the whole quantity of the toner is given as 100 parts by mass. When the quantity of use of the magnetic powder is too much, durability in image density may be reduced, or fixability may be extremely reduced. When the quantity of use of the magnetic powder is too little, fogging easily takes place at the formed image, and thereby the durability in image density may be reduced. Further, when the toner is used as a two-component developer, the quantity of use of the magnetic powder is preferably equal to or less than 20 parts by mass, and more preferably 15 parts by mass when the whole quantity of the toner is given as 100 parts by mass.

<Other Processes of Method of Manufacturing Electrostatic Latent Image Developing Toner>

In the method of manufacturing the electrostatic latent image developing toner, a treatment based on a process (I) below may be performed on the resin particles obtained according to the method of manufacturing the resin particles. Further, the resin particles obtained by the aforementioned method are collected as the electrostatic latent image developing toner or the toner parent particles, to the surfaces to which the external additive is attached to become the toner, by an arbitrary method. As the collecting method, a method consisting of processes (II) and (III) below is preferred. Furthermore, when the resin particles are collected as the toner parent particles, the external additive is attached to the surfaces of the collected toner parent particles by a process (IV) below.

(I) A shape controlling process of heating the resin particles.
(II) A cleaning process of cleaning the resin particles.
(III) A drying process of drying the cleaned resin particles.
(IV) An external adding process of attaching the external additive to the surfaces of the toner parent particles.

In the shape controlling process (I), the components contained in the resin particles obtained by the aggregation of the resin fine-particles are combined into one, and the shape of the obtained toner can be controlled.

In the shape controlling process (I), the temperature when the dispersion of the resin particles is heated is not particularly limited within a range that does not inhibit the purpose of the present disclosure. Typically, the dispersion of the resin particles is preferably heated between a temperature that is equal to or higher than the glass transition temperature of the resin and a temperature that is equal to or lower than a melting point of the resin, and more preferably between a temperature that is +10° C. higher than the glass transition temperature of the resin and a temperature that is equal to or lower than the melting point of the resin. As the dispersion of the resin particles is heated in such a temperature range, the combination of the components contained in the resin particles can be well advanced, and it is easy to prepare the toner having a preferred spheroidicity.

As the dispersion of the resin particles is heated, the shape of the resin particles gradually approaches a spherical shape. A temperature and time in heating the dispersion are controlled, and thereby a degree of spheronization of the particles can be controlled to a desired value. This is because melt viscosity of the resin is reduced by heating, and a change in shape is caused in a direction of the spheronization by a surface tension. A preferred range of the degree of spheronization is between 0.965 and 0.985. The degree of spheronization may be measured by, for instance, "FPIA3000" (available from Sysmex Co., Ltd.). In this way, the dispersion of the toner particles having a desired particle size and shape can be obtained.

The toner particles obtained in the shape controlling process (I) are collected as the electrostatic latent image developing toner or the toner parent particles, to the surfaces to which the external additive is attached to become the toner, by an arbitrary method.

In the cleaning process (II), the resin particles obtained by the aforementioned method are cleaned with water. The cleaning method is not particularly limited, and may include, for example, a method of collecting the resin particles as a wet cake from the dispersion of the resin particles by solid-liquid separation and cleaning the obtained wet cake with water, or a method of precipitating the resin particles in the dispersion of the resin particles, replacing a supernatant solution with water, and then re-dispersing the resin particles in water.

The resin particles cleaned in the cleaning process (II) are dried in the drying process (III). The method of drying the resin particles is not particularly limited. The preferred drying method may include methods of using dryers such as a spray dryer, a fluidized bed dryer, a vacuum freeze dryer, and a reduced-pressure dryer. Among these methods, the method of using the spray dryer is more preferred, because it is easy to suppress the aggregation of the resin particles during drying. When the spray dryer is used, the external additive can be attached to the surfaces of the resin particles by spraying a dispersion of the external additive such as silica along with the dispersion of the resin particles.

The electrostatic latent image developing toner manufactured by the method of the present disclosure may be configured so that the external additive is attached to the surface thereof as needed. When the resin particles are collected as the toner parent particles by the aforementioned method, the external additive is attached to the surface of the toner parent particles in the external adding process (IV). The method of attaching the external additive to the surfaces of the toner parent particles is not particularly limited. The preferred method may include, for instance, a method of mixing the external additive using a mixer such as a Henschel mixer or a Nowter mixer on an adjusted condition so that the external additive is not buried in the toner surface.

A type of the external additive is not particularly limited within a range that does not inhibit the purpose of the present disclosure, and may be appropriately selected from conventional external additives that have been used for toners. Specific examples of the preferred external additive may include metallic oxides such as silica or alumina, titanium oxide, magnesium oxide, zinc oxide, strontium titanate, and barium titanate. These external additives may be used in combinations of two or more. Further, these external additives may be hydrophobized and used by a hydrophobizing agent such as an aminosilane coupling agent or silicone oil. When the hydrophobized external additive is used, it is easy to inhibit a charged amount of the toner from being reduced under high temperature, high humidity, and to obtain the toner that is excellent in fluidity.

A particle size of the external additive is not particularly limited within a range that does not inhibit the purpose of the present disclosure. Typically, the particle size of the external additive preferably ranges from 0.01 to 1.0 µm.

A volume specific resistance value of the external additive may be adjusted by forming an enveloping layer of tin oxide and antimony oxide on the surface of the external additive and changing a thickness of the enveloping layer or a ratio of the tin oxide and the antimony oxide.

A quantity of use of the external additive is not particularly limited within a range that does not inhibit the purpose of the present disclosure. Typically, the quantity of use of the external additive preferably ranges from 0.1 to 10 parts by mass, and more preferably from 0.2 to 5 parts by mass with respect to 100 parts by mass of the toner particles prior to the external adding process.

Further, the toner manufactured by the aforementioned method may be mixed with a desired carrier and used as a two-component developer. Hereinafter, the carrier used when the toner is used as the two-component developer and the two-component developer will be described in turn.

<Carrier>

The electrostatic latent image developing toner obtained by the method of the present disclosure may be mixed with a desired carrier and used as a two-component developer. When the two-component developer is prepared, a magnetic carrier is preferably used.

The preferred carrier when the electrostatic latent image developing toner is used as the two-component developer may include a carrier in which a carrier core material is enveloped with a resin. Specific examples of the carrier core material may include: particles of iron, oxidized iron, reduced iron, magnetite, copper, silicon steel, ferrite, nickel, and cobalt; particles of alloys of any of these metals with manganese, zinc, and aluminum; particles of an iron-nickel alloy and an iron-cobalt alloy; particles of ceramics such as titanium oxide, aluminum oxide, copper oxide, magnesium oxide, lead oxide, zirconium oxide, silicon carbide, magnesium titanate, barium titanate, lithium titanate, lead titanate, lead zirconate, and lithium niobate; particles of high-k substances such as ammonium dihydrogen phosphate, potassium dihydrogen phosphate, and Rochelle salt; and resin carriers obtained by dispersing the aforementioned magnetic particles in a resin.

Specific examples of the resin enveloping the carrier core material may include a (meth)acrylic polymer, a styrenic polymer, a styrene-(meth)acrylic copolymer, an olefinic polymer (polyethylene, chlorinated polyethylene, polypropylene, etc.), polyvinyl chloride, polyvinyl acetate, polycarbonate, cellulose resin, polyester resin, unsaturated polyester resin, polyamide resin, polyurethane resin, epoxy resin, silicone resin, fluorine resin (polytetrafluoroethylene, polychloro trifluoroethylene, polyvinylidene fluoride, etc.), phenolic resin, xylene resin, diallyl phthalate resin, polyacetal resin, and amino resin. These resins may be used in combinations of two or more.

A particle size of the carrier is not particularly limited within a range that does not inhibit the purpose of the present disclosure, but preferably ranges from 20 to 120 µm, and more preferably from 25 to 80 µm in particle size measured by an electron microscope.

When the electrostatic latent image developing toner of the present disclosure is used as the two-component developer, the content of the toner preferably ranges from 3 to 20 wt %, and more preferably from 5 to 15 wt %, with respect to the mass of the two-component developer. As the content of the toner is set to such a range for the two-component developer, a proper image density is maintained in the formed image, and contamination or attachment of the toner to transfer paper in an image forming apparatus can be suppressed by inhibiting toner scattering from a developing device to be described below.

Figure 3:
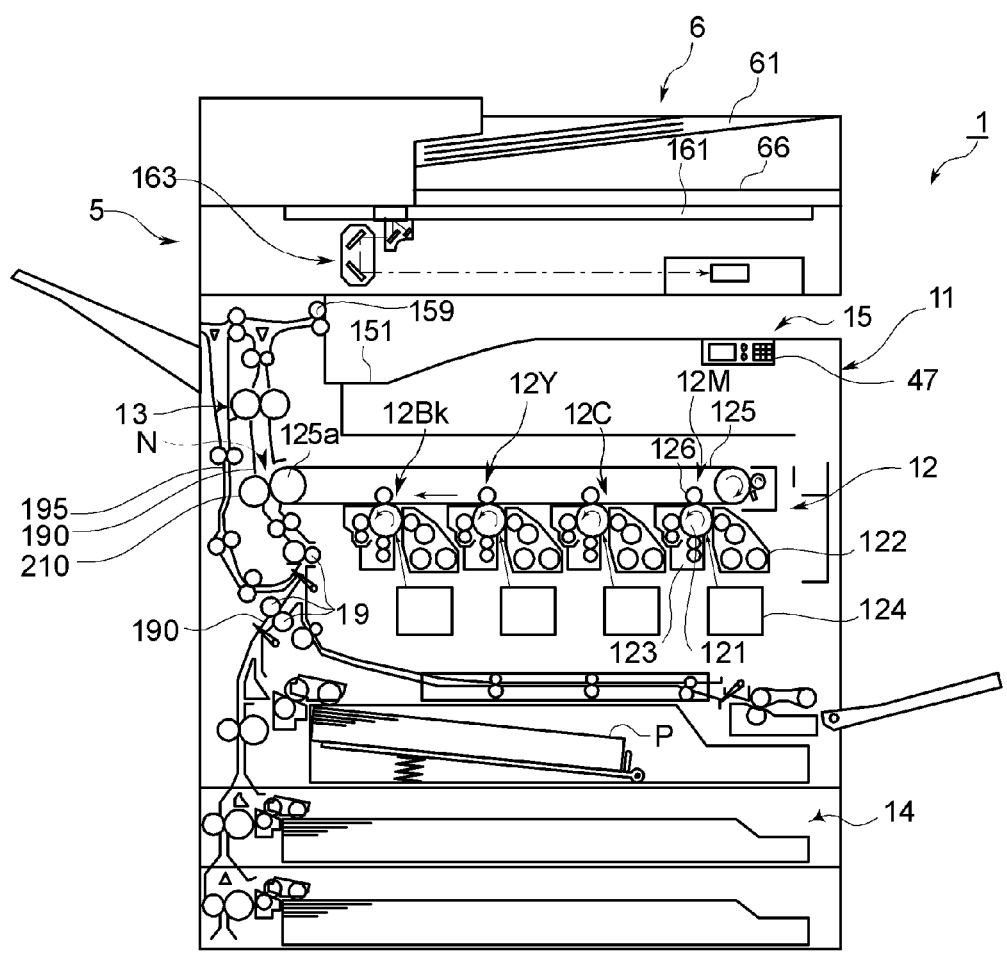
FIG. 3 is a front cross-sectional view showing a structure of an image forming apparatus relating to an embodiment of the present disclosure.

Next, the image forming apparatus relating to an embodiment of the present disclosure will be described. FIG. 3 is a front cross-sectional view showing a structure of an image forming apparatus relating to an embodiment of the present disclosure.

The image forming apparatus 1 relating to the embodiment of the present disclosure is a multifunction device combining, for instance, a plurality of functions such as a copy function, a printer function, a scanner function, and a facsimile function. The image forming apparatus 1 includes an apparatus main body 11, an operating unit 47, an image forming unit 12, a fixing unit 13, a paper feeding unit 14, a document feeding unit 6, and a document scanning unit 5.

When the image forming apparatus 1 performs a document scanning operation, the document scanning unit 5 optically scans an image of a document fed by the document feeding unit 6 or a document loaded on a document loading glass 161, and generates image data. The image data generated by the document scanning unit 5 is stored in a built-in hard disk drive (HDD) or a network-connected computer.

When the image forming apparatus 1 performs an image forming operation, the image forming unit 12 forms a toner image on recording paper P serving as a recording medium fed from the paper feeding unit 14 based on the image data that is generated by the document scanning operation or is stored in the built-in HDD. Image forming units 12M, 12C, 12Y, and 12Bk of the image forming unit 12 are each equipped with a photosensitive drum 121, a charging device 123, an exposure device 124, a developing device 122, and a primary transfer roller 126.

The developing device 122 of each of the image forming units 12M, 12C, 12Y, and 12Bk contains the electrostatic latent image developing toner relating to the present disclosure as the two-component developer. The developing device 122 feeds the toner to a surface of the photosensitive drum 121 for which charging caused by the charging device 123 and exposure caused by the exposure device 124 are completed.

When color printing is performed, the image forming units 12M for magenta, the image forming units 12C for cyan, the image forming units 12Y for yellow, and the image forming units 12Bk for black in the image forming unit 12 form the toner image on the photosensitive drum 121 in charging, exposure, and developing processes based on images composed of respective color components constituting the image data, and transfer the toner image onto an intermediate transfer belt 125, which is suspended on a driving roller 125a and a driven roller 125b under tension, by the primary transfer roller 126.

The intermediate transfer belt 125 is configured so that an image carrying surface to which the toner image is transferred is set to an outer circumferential surface thereof, and is driven by the driving roller 125a in contact with a circumferential surface of the photosensitive drum 121. The intermediate transfer belt 125 travels endlessly between the driving roller 125a and the driven roller 125b in synchronization with each photosensitive drum 121.

The toner image of each color which is transferred onto the intermediate transfer belt 125 overlaps on the intermediate transfer belt 125 by adjusting a transfer timing, thereby becoming a color toner image. A secondary transfer roller 210 transfers the color toner image, which is formed on the surface of the intermediate transfer belt 125, to the recording paper P, which is transported from the paper feeding unit 14 along a transport path 190, in a nip portion N between the secondary transfer roller 210 and the driving roller 125a across the intermediate transfer belt 125. Afterwards, the fixing unit 13 fixes the toner image on the recording paper P to the recording paper P by thermal pressing. The recording paper P on which the color image completing the fixing process is formed is discharged to a discharge tray 151.

EXAMPLES

Hereinafter, the present disclosure will be described in greater detail based on examples. Note that the present disclosure is not at all limited to the examples.

Preparation Example 1

Preparation of Resin Fine-Particle Dispersion 1

A resin fine-particle dispersion 1 was prepared according to the following method. 550 ml of distilled water and 0.35 g of dodecyl sodium sulfate were added into a 1000 ml four-necked flask equipped with an agitator, a cooling pipe, a nitrogen introduction pipe, and a temperature sensor, and were heated to 80° C. while being agitated under a flow of nitrogen. Then, 81 g of a potassium persulfate aqueous solution (concentration of 2.5 wt %) was added. A monomer mixture containing 89 g of styrene, 58 g of n-butyl acrylate, 14 g of methacrylic acid, and 3.3 g of n-octyl mercaptan was dropped for 1.5 hours by a dropping funnel. After the dropping, a reaction solution was agitated at the same temperature for 2 hours, and a polymerization reaction was completed. After the polymerization reaction was terminated, a content was cooled to room temperature, and distilled water was added so that solid content concentration became 5 wt %. A resin fine-particle dispersion 1 of styrene-acrylic resin having a particle size of about 90 nm was obtained. Properties of the styrene-acrylic resin were as follows.

Number-average molecular weight (Mn): 5,400
Mass-average molecular weight (Mw): 18,000
Molecular weight distribution (Mw/Mn): 3.3
Softening point: 91° C.
Glass transition temperature (Tg): 46° C.

Preparation of Resin Fine-Particle Dispersion 2

A resin fine-particle dispersion 2 was prepared according to the following method.
Polyester resin to be described below was used as a resin.
Monomer composition: polyoxypropylene (2,2)-2,2-bis (4-hydroxyphenyl)propane/polyoxyethylene (2,0)-2,2-bis (4-hydroxyphenyl)propane/fumaric acid/trimellitic acid=25/25/46/4 (mol ratio)
Number-average molecular weight (Mn): 2,500
Mass-average molecular weight (Mw): 6,500
Molecular weight distribution (Mw/Mn): 2.6
Softening point: 91° C.
Glass transition temperature (Tg): 51° C.
Acid value: 15.5 mgKOH/g
100 parts by mass of a coarsely pulverized material of polyester resin having an average particle size of about 10 μm, which was coarsely pulverized by Turbomill T250 (available from Turbo Kogyo Co., Ltd.), 2 parts by mass of an anion surfactant (Emaru E27C, available from Kao Co., Ltd.), and 50 parts by mass of 0.1N-sodium hydroxide aqueous solution (basic substance) were mixed, and ion-exchanged water was additionally added as an aqueous medium. Thereby, the whole quantity of 500 parts by mass of a slurry was prepared.

The obtained slurry was put into a pressure-resistant round-bottomed stainless container, and was subjected to shear dispersion at a rotor rotational speed of 20,000 rpm for 30 minutes using a high-speed shear emulsion apparatus, Clearmix (CLM-2.2S, available from M Technique Co., Ltd.), in a state in which the slurry was heated at 145° C. under pressure of 0.5 MPa (G). Afterwards, the slurry was cooled at a velocity of 5° C./min, and continued to be agitated at a rotor rotational speed of 15,000 rpm until a temperature in the stainless container became 50° C. Then, the slurry was cooled to room temperature at a velocity of 5° C./min, and distilled water was added so that a solid content concentration became 5%. Thereby, a resin fine-particle dispersion 2 of polyester resin having a particle size of about 140 nm was obtained.

Preparation of Resin Fine-Particle Dispersion 3

A resin fine-particle dispersion 3 was prepared according to the following method.
Polyester resin to be described below was used as a resin.
Monomer composition: polyoxypropylene (2,2)-2,2-bis (4-hydroxyphenyl)propane/polyoxyethylene (2,0)-2,2-bis (4-hydroxyphenyl)propane/fumaric acid/trimellitic acid=25/25/46/4 (mol ratio)
Number-average molecular weight (Mn): 2,500
Mass-average molecular weight (Mw): 6,500
Molecular weight distribution (Mw/Mn): 2.6
Softening point: 91° C.
Glass transition temperature (Tg): 51° C.
Acid value: 15.5 mgKOH/g
1000 parts by mass of a coarsely pulverized material of polyester resin having an average particle size of about 10 μm, which was coarsely pulverized by Turbomill T250 (available from Turbo Kogyo Co., Ltd.), 50 parts by mass of cyan pigment (coloring agent, copper phthalocyanine, C.I. Pig. Blue 15-3, available from Dainichiseika Color & Chemicals Mfg. Co., Ltd.), and 70 parts by mass of pentaerythritol behenate ester WAX (release agent, WEP-5, available from NOF Corporation, melting point of 84° C.) were added into a fluidity mixing apparatus, FM MIXER (FM-20C/I Type, available from Nippon Coke & Engineering Co., Ltd.), and were mixed at a temperature of 45° C. or less for 5 minutes. Next, the obtained mixture was put into and kneaded in an open roll type two-roll continuous kneader (Kneadex MOS-160 Type, available from Nippon Coke & Engineering Co., Ltd.). The obtained kneaded material was cooled, and a colored resin composition having a pigment concentration of 5 wt % was obtained.

The obtained colored resin composition was coarsely pulverized by Turbomill T250 (available from Turbo Kogyo Co., Ltd.), and a coarsely pulverized material having an average particle size of about 10 μm was prepared. 100 parts by mass of the coarsely pulverized material of the colored resin composition, 2 parts by mass of an anion surfactant (Emaru E27C, available from Kao Co., Ltd.), and 50 parts by mass of 0.1N-sodium hydroxide aqueous solution (basic substance) were mixed, and ion-exchanged water was additionally added as an aqueous medium. Thereby, the whole quantity of 500 parts by mass of a slurry was prepared.

The obtained slurry was put into a pressure-resistant round-bottomed stainless container, and was subjected to shear dispersion at a rotor rotational speed of 20,000 rpm for 30 minutes using a high-speed shear emulsion apparatus, Clearmix (CLM-2.2S, available from M Technique Co., Ltd.), in a state in which the slurry was heated at 145° C. under pressure of 0.5 MPa (G). Afterwards, the slurry was cooled at a velocity of 5° C./min, and continued to be agitated at a rotor rotational speed of 15,000 rpm until a temperature in the stainless container became 50° C. Then, the slurry was cooled to room temperature at a velocity of 5° C./min, and distilled water was added so that a solid content concentration became 5%. Thereby, a resin fine-particle dispersion 3 of polyester resin having a particle size of about 180 nm was obtained.

Dispersions of the resin particles or the electrostatic latent image developing toner were prepared by an acid pasting method and methods of Examples 1 to 34 below using a forced thin film reactor (ULREA SS-11, available from M Technique Co. Ltd.) as a microreactor.

Examples 1 to 9

In Examples 1 to 9, apparatus conditions of the microreactor were set as follows. The resin fine-particle dispersion 1 was fed from the first stock solution feed part x under the following conditions, and a magnesium chloride ($MgCl_2$) aqueous solution having a concentration set forth in Table 1 below as a resin fine-particle aggregating agent was fed from the second stock solution feed part y under the following conditions. Afterwards, the dispersion of the resin particles was obtained by the solution discharge part z having a cooling jacket. A pH value of the resin fine-particle dispersion 1 was previously adjusted to 9 by adding triethanolamine.

<Apparatus Conditions>
Back pressure: 0.02 MPa
Process feed pressure: 0.3 MPa
Disc rotational speed: 500 rpm
<Conditions of First Stock Solution Feed Part>
Solution temperature: 70° C.
Flow rate: 50 ml/min
<Conditions of Second Stock Solution Feed Part>
Solution temperature: 60° C.
Flow rate: Flow rate set forth in Table 1 below A volume average particle size (MV) and a number average particle size (MN) of the resin particles contained in the obtained dispersion were measured using a particle size distribution measuring apparatus (MT3300, available from Microtrac Inc.). Further, a particle size distribution (MV/MN) was calculated from values of the measured MV and MN. Measurement and calculation results of MN, MV, and MV/MN are shown in Table 1.

TABLE 1

|  | Second stock solution concentration (%) | Second stock solution flow rate (ml/min) | Volume average particle size MV (μm) | Number average particle size MN (μm) | MV/MN |
| --- | --- | --- | --- | --- | --- |
| Example 1 | 10 | 5 | 4.70 | 3.00 | 1.57 |
| Example 2 | 20 | 5 | 9.69 | 4.10 | 2.36 |
| Example 3 | 20 | 10 | 6.13 | 3.72 | 1.65 |
| Example 4 | 30 | 5 | 13.31 | 5.02 | 2.65 |
| Example 5 | 30 | 10 | 14.49 | 5.25 | 2.76 |
| Example 6 | 10 | 10 | 15.21 | 6.37 | 2.39 |
| Example 7 | 5 | 5 | 1.51 | 0.13 | 11.62 |
| Example 8 | 5 | 10 | 3.38 | 0.79 | 4.28 |
| Example 9 | 5 | 20 | 5.40 | 3.24 | 1.67 |

According to Table 1, it was found that, when the resin particles were manufactured using the microreactor, both or one of a concentration and a feed rate of the second stock solution were adjusted, and thereby a particle size and particle size distribution of the obtained resin particles could be controlled.

Examples 10 to 15

In Examples 10 to 15, apparatus conditions of the microreactor were set as follows. The resin fine-particle dispersion 2 was fed from the first stock solution feed part x under the following conditions, and a magnesium chloride ($MgCl_2$) aqueous solution having a concentration of 5 wt % was fed as a resin fine-particle aggregating agent from the second stock solution feed part y under the following conditions. Afterwards, the dispersion of the resin particles was obtained by the solution discharge part z having a cooling jacket. A pH value of the resin fine-particle dispersion 2 was previously adjusted to 9 by adding triethanolamine. Measurement and calculation results of a volume average particle size (MV), a number average particle size (MN), and a particle size distribution (MV/MN), which were measured and calculated for the resin particles contained in the dispersions obtained in Examples 10 to 15, are shown in Table 2.

<Apparatus Conditions>
Back pressure: 0.02 MPa
Process feed pressure: 0.3 MPa
Disc rotational speed: Rotational speed set forth in Table 2 below
<Conditions of First Stock Solution Feed Part>
Solution temperature: 40° C.
Flow rate: 50 ml/min
<Conditions of Second Stock Solution Feed Part>
Solution temperature: 25° C.
Flow rate: 20 ml/min

TABLE 2

|  | Disc rotational speed (rpm) | Volume average particle size MV (μm) | Number average particle size MN (μm) | MV/MN |
| --- | --- | --- | --- | --- |
| Example 10 | 500 | 10.79 | 3.22 | 3.35 |
| Example 11 | 1000 | 5.98 | 3.50 | 1.71 |
| Example 12 | 2000 | 6.34 | 3.53 | 1.80 |
| Example 13 | 3000 | 9.07 | 4.57 | 1.98 |
| Example 14 | 4000 | 9.51 | 4.55 | 2.09 |
| Example 15 | 5000 | 10.33 | 4.50 | 2.30 |

Examples 16 to 19

In Examples 16 to 19, except that apparatus conditions of the microreactor and conditions of feed temperatures of the first stock solution and the second stock solution were set as follows, the other conditions were set similar to those of Examples 10 to 15, and the dispersion of the resin particles was obtained. Further, measurement and calculation results of a volume average particle size (MV), a number average particle size (MN), and a particle size distribution (MV/MN), which were measured and calculated for the resin particles contained in the dispersions obtained in Examples 16 to 19, are shown in Table 3.

<Apparatus Conditions>
Back pressure: 0.02 MPa
Process feed pressure: 0.3 MPa Disc rotational speed: Rotational speed set forth in Table 3 below
<Conditions of First Stock Solution Feed Part>
Solution temperature: 90° C.
Flow rate: 50 ml/min
<Conditions of Second Stock Solution Feed Part>
Solution temperature: 60° C.
Flow rate: 20 ml/min

TABLE 3

|  | Disc rotational speed (rpm) | Volume average particle size MV (μm) | Number average particle size MN (μm) | MV/MN |
|---|---|---|---|---|
| Example 16 | 500 | 8.28 | 3.46 | 2.39 |
| Example 17 | 1000 | 6.17 | 3.64 | 1.70 |
| Example 18 | 2000 | 8.81 | 4.45 | 1.98 |
| Example 19 | 3000 | 18.05 | 4.83 | 3.74 |

According to Tables 2 and 3, it was found that, when the resin particles were manufactured using the microreactor, both or one of a concentration and a feed rate of the second stock solution were adjusted, and thereby a particle size and particle size distribution of the obtained resin particles could be controlled.

Examples 20 to 25

In Examples 20 to 25, except that apparatus conditions of the microreactor were set as follows, the other conditions were set similar to those of Examples 16 to 19, and the dispersion of the resin particles was obtained. Further, measurement and calculation results of a volume average particle size (MV), a number average particle size (MN), and a particle size distribution (MV/MN), which were measured and calculated for the resin particles contained in the dispersions obtained in Examples 20 to 25, are shown in Table 4.
<Apparatus Conditions>
Back pressure: Back pressure set forth in Table 4 below
Process feed pressure: 0.3 MPa
Disc rotational speed: 1,000 rpm
<Conditions of First Stock Solution Feed Part>
Solution temperature: 90° C.
Flow rate: 50 ml/min
<Conditions of Second Stock Solution Feed Part>
Solution temperature: 60° C.
Flow rate: 20 ml/min

TABLE 4

|  | Back pressure (MPa) | Volume average particle size MV (μm) | Number average particle size MN (μm) | MV/MN |
|---|---|---|---|---|
| Example 20 | 0.02 | 7.20 | 4.28 | 1.68 |
| Example 21 | 0.00 | 9.18 | 4.21 | 2.18 |
| Example 22 | 0.04 | 5.77 | 3.39 | 1.70 |
| Example 23 | 0.06 | 5.52 | 3.43 | 1.61 |
| Example 24 | 0.08 | 5.59 | 3.60 | 1.55 |
| Example 25 | 0.10 | 4.76 | 3.05 | 1.56 |

According to Table 4, it was found that, when the resin particles were manufactured using the microreactor, a back pressure applied to the rotating disc of the microreactor was adjusted, and thereby a particle size and particle size distribution of the obtained resin particles could be controlled.

Examples 26 to 34

In Examples 26 to 34, apparatus conditions of the microreactor were set as follows. The resin fine-particle dispersion 3 was fed from the first stock solution feed part x under the following conditions, and a aggregating agent aqueous solution having a concentration and a kind set forth in Table 5 below was fed as a resin fine-particle aggregating agent from the second stock solution feed part y under the following conditions. Afterwards, the dispersion of the resin particles was obtained by the solution discharge part z having a cooling jacket. A pH value of the resin fine-particle dispersion 3 was previously adjusted to 9 by adding triethanolamine. Measurement and calculation results of a volume average particle size (MV), a number average particle size (MN), and a particle size distribution (MV/MN), which were measured and calculated for the resin particles contained in the dispersions obtained in Examples 26 to 34, are shown in Table 5.
<Apparatus Conditions>
Back pressure: 0.08 MPa
Process feed pressure: 0.3 MPa
Disc rotational speed: 1,000 rpm
<Conditions of First Stock Solution Feed Part>
Solution temperature: 90° C.
Flow rate: 50 ml/min
<Conditions of Second Stock Solution Feed Part>
Solution temperature: 60° C.
Flow rate: Flow rate set forth in Table 5 below

TABLE 5

|  | Kind of aggregating agent | Second stock solution concentration (%) | Second stock solution flow rate (ml/min) | Volume average particle size MV (μm) | Number average particle size MN (μm) | MV/MN |
|---|---|---|---|---|---|---|
| Example 26 | MgCl$_2$ | 5 | 20 | 5.30 | 3.57 | 1.48 |
| Example 27 | NaCl | 20 | 5 | 0.14 | 0.11 | 1.27 |
| Example 28 | NaCl | 20 | 10 | 0.14 | 0.09 | 1.56 |
| Example 29 | NaCl | 20 | 20 | 2.39 | 0.87 | 2.75 |
| Example 30 | NaCl | 20 | 50 | 5.28 | 3.71 | 1.42 |
| Example 31 | Al$_2$(SO$_4$)$_3$ | 20 | 5 | 28.76 | 7.40 | 3.89 |

TABLE 5-continued

| | Kind of aggregating agent | Second stock solution concentration (%) | Second stock solution flow rate (ml/min) | Volume average particle size MV (μm) | Number average particle size MN (μm) | MV/MN |
|---|---|---|---|---|---|---|
| Example 32 | Al$_2$(SO$_4$)$_3$ | 20 | 10 | 11.29 | 6.02 | 1.88 |
| Example 33 | Al$_2$(SO$_4$)$_3$ | 20 | 20 | 15.67 | 8.11 | 1.93 |
| Example 34 | Al$_2$(SO$_4$)$_3$ | 20 | 50 | 12.02 | 7.88 | 1.53 |

According to Table 5, it was found that, when the electrostatic latent image developing toner was manufactured using the microreactor, a kind of the aggregating agent contained in the second stock solution, a concentration of the second stock solution, and/or a flow rate of the second stock solution were adjusted, and thereby a particle size and particle size distribution of the obtained toner could be controlled.

As shown in Tables 1 to 5, the resin particles and the electrostatic latent image developing toner, which have a desired particle size, could be obtained within a short time by the method of mixing the first stock solution and the second stock solution and aggregating the resin fine-particles to obtain the resin particles using the microreactor equipped with: the stationary disc A and the rotating disc B that were two discoid discs and that were disposed with a gap so that a thin layer could be formed between circular surfaces of the two discs; the first stock solution feed part that fed the first stock solution, that was the resin fine-particle dispersion, from an end of the gap into the gap; and at least one second stock solution feed part that was formed at the opposite side of the first stock solution feed part based on the center of the circular surface of the stationary disc by spatially connecting top and bottom surfaces of the stationary disc, and that fed the second stock solution containing the aggregating agent from the top surface side of the stationary disc to the gap.

Comparative Example 1

As Comparative Example 1, toner was prepared by a fine-particle aggregating method of a conventional method.

A temperature sensor, a cooling pipe, and an agitator were set for a 1-liter four-necked (mouth) flask, and 425 g of the resin fine-particle dispersion 3, 12 g of an anion surfactant (Emaru 0, available from Kao Co., Ltd.), and 75 g of ion-exchanged water were added into the flask and agitated at an agitating speed of 200 rpm. Further, triethanolamine was added into the flask, and pH of a content in the flask was adjusted to 9. Next, an aqueous solution obtained by dissolving 10.2 g of aluminum chloride hexahydrate in 10.2 g of ion-exchanged water was added. After the mixture was left alone for 5 minutes, it was heated to 50° C. at 5° C./min, and then to 73° C. at a speed of 0.5° C./min. Afterwards, the mixture was maintained at 73° C., and was agitated at an agitating speed of 350 rpm at a time point at which a volume average particle size of aggregated particles became 6.5 μm. Then, the mixture was cooled to room temperature at a speed of 5° C./min. Thereby, a dispersion of the toner having a volume average particle size of 6.6 μm, number average particle size of 5.7 μm, and an average circularity of 0.93 was obtained. 20.4 g of resin particles was manufactured in 90 minutes from heating start to cooling completion.

In the conventional fine-particle aggregating method, a manufactured amount of the resin particles is decided by an added amount of a raw material, and a time required for the manufacturing is not greatly changed by the added amount. Further, in the conventional fine-particle aggregating method, it is checked whether or not a remaining material in a reaction container is attached in each manufacturing. When the remaining material is attached, it is necessary to clean an interior of the container. As such, when the manufacturing is repeated, it necessarily takes a great deal of time in addition to a time which it take to aggregate the fine particles.

In contrast, in the method of manufacturing resin particles of the present disclosure, the resin particles can be continuously obtained, and the manufactured amount of the resin particles is decided by a manufacturing speed and time of the resin particles. The manufacturing speed of the resin particles is decided by the feed rate of the first stock solution. For example, when the feed rate of the first stock solution is 50 ml/min, and when the resin fine-particle dispersion having a solid content concentration of 5% is used as the first stock solution, the resin particles can be manufactured at a speed of about 2.5 g/min, and 20.4 g of the resin particles manufactured in about 90 minutes in the conventional manufacturing method can be manufactured in about 8.5 minutes. For this reason, the manufacturing method of the present disclosure can obtain resin particles of a desired particle size within a short time, compared to the conventional fine-particle aggregating method. Furthermore, since no other work is required while continuously manufacturing the resin particles, resin particles of the desired particle size can be obtained within a short time, compared to the conventional fine-particle aggregating method.

Reference Example 1

500 g of the dispersion of the resin particles obtained in Example 11 was left alone, and the resin particles were precipitated. Then, a supernatant solution was removed by decantation, and was replaced with an aqueous solution of an anion surfactant (Emaru 0, available from Kao Co., Ltd.) which had the concentration of 3 wt % and the same mass as that of the removed supernatant solution. Thereby, a dispersion of resin particles was obtained. Afterwards, the dispersion was agitated, and a volume average particle size (MV) was measured for the resin particles contained in the dispersion using a particle size distribution measuring apparatus (MT3300, available from Microtrac Inc.).

It was found that the volume average particle size (MV) of the resin particles contained in the dispersion obtained in Reference Example 1 was about 1 μm, and was smaller than the volume average particle size (MV) of the resin particles obtained in Example 11. This was thought to be because the resin particles obtained in Example 11 were re-dispersed in the dispersion by a surfactant.

Reference Example 2

A dispersion of resin particles was obtained using the dispersion of the resin particles obtained in Example 26 by a method similar to that of Reference Example 1. A volume average particle size (MV) of the resin particles contained in the obtained dispersion was measured.

It was found that the volume average particle size (MV) of the resin particles contained in the dispersion obtained in Reference Example 2 was not different from the volume average particle size (MV) of the resin particles contained in the dispersion obtained in Example 26. This was thought to be because, since the first stock solution was fed at a temperature (90° C.) equal to or higher than Tg of the resin in the resin particles obtained in Example 26, the resin particles were aggregated by fusion that was partly caused between the resin fine-particles. For this reason, it was thought that, in comparison with the resin particles in the dispersion obtained in Reference Example 1, the resin particles in the dispersion obtained in Reference Example 2 were not re-dispersed in the dispersion by the surfactant.

Example 35

A dispersion was obtained using the dispersion of the resin particles obtained in Example 26 by a method similar to that of Reference Example 2. The obtained dispersion was put into a 1000 ml reaction container equipped with an agitator, a cooling pipe, and a temperature sensor, was heated to 65° C., and was agitated at the same temperature for 2 hours. Then, the dispersion in the reaction container was cooled to room temperature, and was repeatedly filtered and cleaned. Resin particles were collected as toner parent particles, and a wet cake of the toner parent particles was obtained. The wet cake of the toner parent particles was dried for 72 hours on a condition of 40° C. Thereby, the toner parent particles having a volume average particle size (MV) of 5.2 μm and a circularity of 0.96 were obtained.

0.4 g of positively chargeable silica (90Q available from Nippon Aerosil Co., Ltd., and subjected to surface treatment with silicon oil and aminosilane) was added to the obtained toner parent particles of 20 g, and was mixed for 10 minutes by a mixing apparatus, thereby obtaining toner. To obtain 100 parts by mass of ferrite carrier (particle size of 35 μm) coated with fluorinated silicone resin with respect to 10 parts by mass of obtained toner, these materials were put into a mixing apparatus, and were mixed for 30 minutes, thereby obtaining a two-component developer. The two-component developer was filled in a developing device using a printer (FS-C5100, available from KYOCERA Document Solutions Co., Ltd.). Further, it was confirmed that an image of a desired quality was formed by filling the toner in a toner container of the printer and performing image formation.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A method of manufacturing resin particles, the method comprising the step of using a microreactor to mix a first stock solution and a second stock solution and to aggregate resin fine-particles to obtain resin particles, the microreactor including:
   a stationary disc and a rotating disc that are two discoid discs and that are disposed so that a gap is formed between circular surfaces of the two discs when the resin particles are manufactured;
   a first stock solution feed part that feeds the first stock solution, which is a resin fine-particle dispersion, from an end of the gap into the gap; and
   one or more second stock solution feed parts that are formed at an opposite side of the first stock solution feed part based on the center of the circular surface of the stationary disc by spatially connecting top and bottom surfaces of the stationary disc, and that feed the second stock solution containing an aggregating agent from the top surface side of the stationary disc to the gap,
   wherein an opposite end of the end of the gap where the first stock solution feed part is provided is a solution discharge part of the resin particles,
   the second stock solution includes, as the aggregating agent, any of an inorganic metallic salt, an inorganic ammonium salt, and a divalent or higher metallic complex,
   the resin fine-particles contain a coloring agent and a release agent, and
   the resin particles are manufactured to obtain the resin particles having a volume average particle size (MV) of 1.51 to 18.05 μm, a number average particle size (MN) of 0.13 to 8.11 μm, and a value of MV/MN of 1.27 to 11.62 by adjusting a concentration of the second stock solution, a flow rate of the second stock solution, and a temperature of the second stock solution, and by further step of subjecting the resin particles to heat treatment by heating a dispersion of the resin particles between a temperature equal to or higher than a glass transition temperature of the resin and a temperature equal to or lower than a melting point of the resin.

2. The method of manufacturing resin particles according to claim 1, wherein the further step of heat treatment heats the resin particles to a dispersion of the resin particles between a temperature +10° C. higher than a glass transition temperature of the resin and a temperature equal to or lower than a melting point of the resin.

3. The method of manufacturing resin particles according to claim 1, wherein the resin particles are manufactured to obtain the resin particles having a volume average particle size (MV) of 1.51 to 18.05 μm, a number average particle size (MN) of 0.13 to 8.11 μm, and a value of MV/MN of 1.27 to 11.62 by adjusting a rotational speed of the rotating disc, a temperature of the first stock solution, and back pressure applied to the rotating disc, in addition to the concentration of the second stock solution, the flow rate of the second stock solution, and the temperature of the second stock solution, and by further step of subjecting the resin particles to heat treatment by heating a dispersion of the resin particles between a temperature equal to or higher than a glass transition temperature of the resin and a temperature equal to or lower than a melting point of the resin.

* * * * *